May 25, 1943.　　　　G. C. WILHIDE　　　　2,320,113
PORTABLE ELECTRIC TOOL MOTOR CONSTRUCTION
Original Filed Feb. 18, 1941
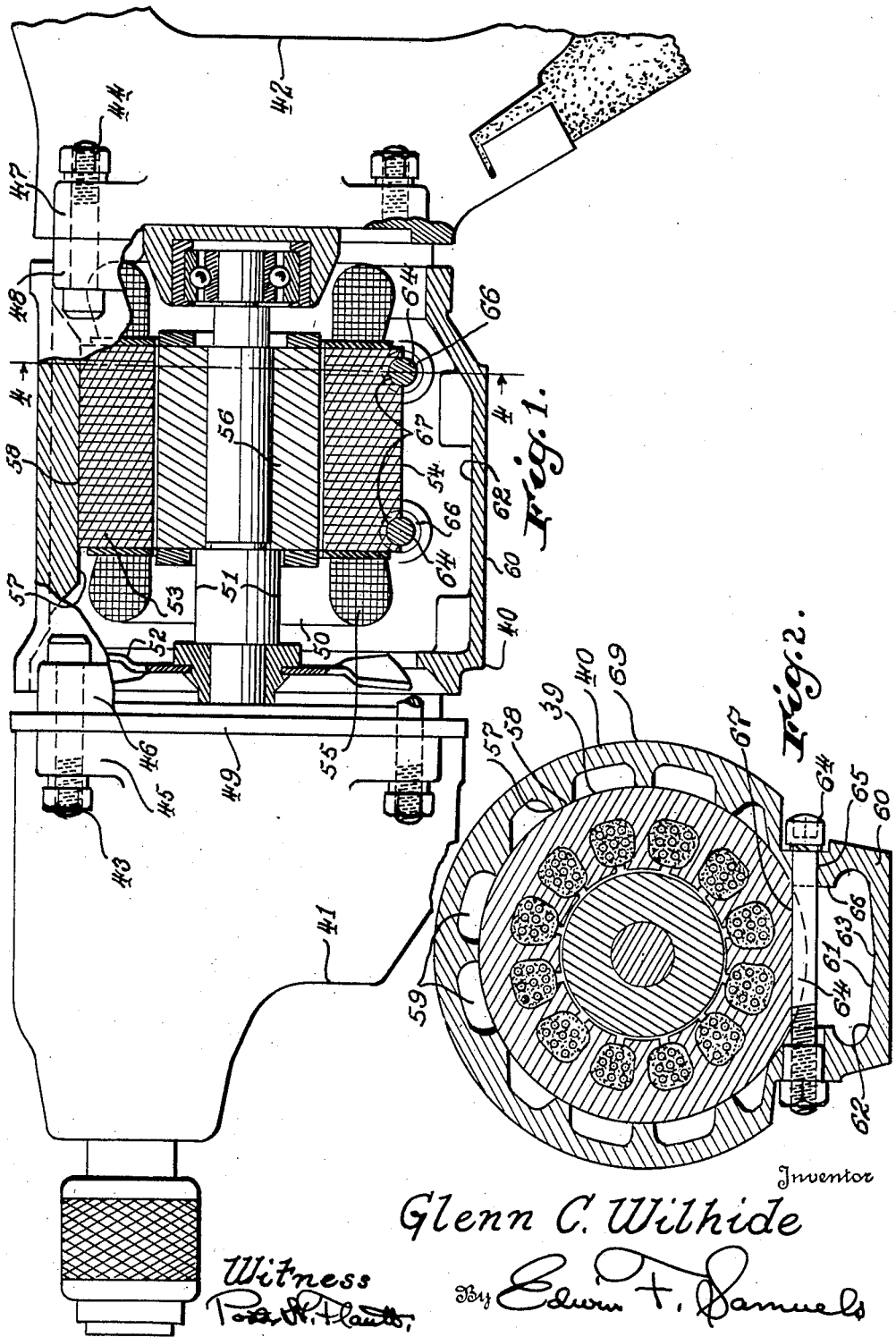
Inventor
Glenn C. Wilhide
Witness
By Edwin T. Samuels
Attorney Patented May 25, 1943

2,320,113

UNITED STATES PATENT OFFICE 2,320,113

PORTABLE ELECTRIC TOOL MOTOR CONSTRUCTION

Glenn C. Wilhide, Baltimore County, Md., assignor to The Black and Decker Manufacturing Company, Towson, Md., a corporation of Maryland Original application February 18, 1941, Serial No. 379,413. Divided and this application October 7, 1941, Serial No. 414,032

9 Claims. (Cl. 172—36)

This application is a division of application Serial No. 379,413, filed February 18, 1941.

The invention relates to the construction of portable electric tools and particularly to the motor housing or field casing and stator and the manner of mounting and securing the stator to overcome existing defects and causes of failure. The motors of these tools, due to the limitations imposed by the conditions incident to the use of the tools, both for portability and for convenience in operating in confined spaces, must be as small, compact and light as the power, speed, rigidity and durability requirements will permit. In motors of the three-phase type and other motors made to meet these conditions there is insufficient room for screws and similar fastening means passing through the laminations of the stator iron or field core in the direction of the motor axis, which is a usual construction in motors for other purposes where a lesser degree of compactness is required.

On account of this difficulty, it has been customary in the construction of small portable electric tool motors of this type to fasten the stator iron or field core by means of set screws extending through the motor casing and threaded into the stator iron. Such screws have been radially disposed and located at various points.

The tools are ordinarily operated with the chuck and bit and gear casing disposed downwardly and there is a constant tendency for any of the motor parts which may be in any way released to drop down into the fan with consequent injury to the fan or to the winding. In these constructions if the fastenings are sufficiently loosened the stator tends to slip down and come into contact with the fan with the result that the windings are damaged and the motor requires major repairs in the nature of replacement of the windings.

The form herein disclosed is adapted to use in tools where an integral field casing or housing is considered a necessity or an advantage. In this instance, the casing or field housing has contacting surfaces or lands arranged about its inner circumference and preferably spaced to provide for ventilation and adapted to engage the peripheral surface of the stator, and the casing is contracted circumferentially by transverse tension members causing these contacting surfaces to grip the stator which is thus clamped and held stationary. It may be held against longitudinal motion by the transverse members shown in the form of bolts which apply the contracting tension or by other suitable means. In the form shown the casing has a yielding or compressible area extending longitudinally and spanned by the tension means whereby the casing is contracted to clamp the stator or field, and prevent shifting and rotation thereof.

In the accompanying drawing, I have illustrated a portable electric tool embodying the features of my invention in the preferred form.

In the drawing:

Figure 1 is a side elevation of an electric drill, equipped with a motor embodying the features of my invention in the preferred form, the central portion of the figure being broken away to show the motor and casing in section on a vertical plane of the axis of the motor, the handle being broken away for convenience of illustration.

Fig. 2 is a section on the line 2—2 in Fig. 1, looking in the direction of the arrows.

The construction shown is particularly adapted for use in a portable or hand supported and directed tool where an integral rigid casing is desired. In this form of motor the casing is so constructed that it may be contracted by transverse screw bolts or pinch bolts and the casing has inwardly projecting portions extending longitudinally on its inner surface which contact the stator core or laminations when the casing is thus contracted, clamping the stator in position and in the preferred construction the stator has transverse grooves engaged by the screw bolts or pinch bolts or other suitable means and providing a positive positioning of the stator in the direction of the axis, and otherwise, whereby even in the event of the loosening of the pinch bolts there is no harmful yielding or displacement of the stator either in the direction of the axis or in a circumferential direction.

More specifically described, the construction shown comprises a motor or field casing 40 at the opposite ends of which are shown the usual gear casing 41 and hand grip 42 respectively. These may be secured in any suitable manner as by means of bolts 43 and 44 or other suitable securing means, preferably outside the casing.

In the construction shown, the bolts 43 are passed through lugs 45 on the gear casing and lugs 46 on the field casing or housing and the bolts 44 are passed through lugs 47, 48, all of which lugs are suitably located and bored in alignment and the standard construction includes a gear cover plate 49.

The motor 50 enclosed in the motor housing or field casing 40 has a shaft 51 on which is mounted a cooling fan 52 and the stationary field or stator indicated by reference character 53 consists of stator iron or core 64 and coil 55 and the rotor is indicated by reference character 56.

While the construction may be regarded as particularly adapted for use in portable tools equipped with the three phase or high frequency motors with which the high power tools of small size and extreme compactness are most generally equipped, it is adapted for use in similar tools with universal and other types of motor, particularly where small overall dimension relative to power output is desirable or essential.

In accordance with the preferred construction the field casing or housing 40 is provided with projections 57, having lands, otherwise defined as clamping areas or surfaces 58, arranged on a circumference or bore which corresponds rather closely to the circumference of the stator iron or core 54, being normally, i. e., in the absence of the contraction to be described, adapted to admit the stator with reasonable freedom. The clamping surfaces or areas 58 separately or collectively may be of sufficient longitudinal extent to contact the outer peripheral surfaces 39 of the core 54 supporting the laminations throughout substantially the entire length of the stator core 54 the bore being such that surfaces 58 on projections 57 are adapted to clamp and position the core when the field casing or housing is contracted as above suggested. The grooves 59, or passages, between the projections 57 assist in cooling and ventilating the motor, otherwise continuity of surfaces 58 would be feasible.

The field casing or housing 40, as already pointed out, is preferably of the unitary type, i. e., in a single piece or similarly constructed. This housing is provided with a compressible area preferably located at the bottom of the casing, as the tool is held normally in horizontal position, so that it is toward the operator and out of the way under the usual circumstances of operation. This is shown in the form of a box or channel section 60 projecting downwardly away from the motor shaft 51 as seen in both Figs. 1 and 2 and extending longitudinally of the field casing or housing and parallel to the axis or substantially so. Any suitable compressible element may be substituted for said box section 60.

In the form shown there is a cavity or groove 61 enclosed by said channel and the walls of said channel are sufficiently thin to provide the desired degree of compressibility. It may be noted that, in the form shown, which, as pointed out, is subject to a wide range of substitution and variation, the bottom wall 62 of the channel is of a thickness having a reducing taper toward the transverse center 63.

In the form shown, this box section or channel 60 is spanned by pinch bolts or through bolts 64 in suitable holes 65 formed in bosses 66.

In the form shown, these bolts pass through transverse grooves 67 in the stator core 54 near its opposite ends whereby the stator is secured against displacement particularly in the direction of its axis but also against rotation. In this capacity bolts 64 have a keying function, other means being usable for this purpose within the broad scope of the invention contemplated.

It is of particular importance that as the bolts 64 are tightened the box section 60 tends to yield, it being found that in the absence of the stator the transverse diameter of the housing as at 40 can be contracted to the extent of approximately $3/1000$ to $5/1000$ of an inch.

Assuming that the lands or clamping surfaces 58 of the projections 57 are arranged on a bore or in a cylindrical or other suitable surface of dimensions sufficient to admit the stator core 54 allowing for a play of $1/1000$ or $2/1000$ of an inch, and the bolts 64 are then tightened, the lands or clamping surfaces 58 will grip the stator tightly preventing it from rotating in the housing, the tension being normally sufficient to also prevent longitudinal motion of the stator.

In combination with this gripping means, the pinch bolts 64 in the grooves 67 eliminate any possibility in the case of relaxation of the tension of these bolts, that the stator or field 53 may yield in an axial direction downwardly or toward the fan bringing the coil 55 into contact therewith. It is also notable that there are no movable or removable nuts or bolts or other fastenings inside the casing which may become loosened or released and by entering the fan or contacting the rotating parts cause injury to the motor.

I have thus described specifically and in detail the application of the principles of my invention and the manner of constructing, applying, operating and using the same, the description being specific and in detail in order that the manner of constructing, operating and using the invention may be fully understood, however, the specific terms herein are used descriptively rather than in a limiting sense, the scope of the invention being defined in the claims.

What I claim as new and desire to secure by Letters Patent is:

1. A portable electric tool having a field casing adapted to support at its opposite ends, a gear casing and a handle, said tool having in said field casing a motor with a stator and a stator core, the field casing having inwardly projecting portions with their inner surfaces arranged in correspondence with the circumference of the core and means for contracting the circumference of the field casing whereby said surfaces grip and clamp the core.

2. A portable electric tool having a field casing adapted for attachment of a gear casing at one end and a handle at the other end, said tool having a motor in said field casing with a stator and stator core, said field casing being of flexible construction and adapted to circumferential contraction and having means for engaging the circumference of the core and transversely extending means for contracting the casing to clamp the core, the core having transverse surfaces engaging the latter means to prevent longitudinal motion of the core.

3. A portable electric tool having a field casing with a motor therein, the motor having a stator with a stator core, said casing having inwardly projecting portions with clamping surfaces thereon spaced about its inner periphery and the surfaces being arranged in close conformance to the circumference of the core, said casing being adapted for circumferential contraction and having transverse tension means spaced outwardly from the axis for contracting the casing to grip the core, said projecting portions being spaced apart to provide ventilating passages.

4. A portable electric tool having a field casing with a motor therein, the motor having a stator with a stator core, said casing having inwardly projecting portions with clamping surfaces thereon spaced about its inner periphery, the surfaces being arranged in close conformance to the circumference of the core but adapted to admit the core, said casing being adapted for circumferential contraction and having transverse tension means spaced outwardly from the axis for contracting the core, the core having transverse surfaces engaging said transverse means whereby the core is held against motion in the direction of its axis.

5. A portable electric tool having a field casing with a motor therein, the motor having a stator with a stator core, said casing having inwardly projecting portions with clamping surfaces thereon spaced about its inner periphery and the surfaces being arranged in close conformance to the outer longitudinal surface of the core, said casing being adapted for circumferential contraction and having transverse tension means for contracting the casing to grip the core, the said inwardly projecting portions on the inner periphery of the casing being in the form of longitudinal ribs providing longitudinal ventilating passages between the ribs.

6. A portable electric tool having a field casing and a motor therein, the motor having a stator with a laminated core, the field casing having inwardly disposed surfaces arranged in the form of a bore of a size slightly exceeding the size of the core and conforming to its surface, said casing having a longitudinally extending channel portion and transverse bolts for contracting said channel portion and thereby contracting the casing to grip the core.

7. A portable electric tool having a field casing and a motor therein, the motor having a stator with a laminated core, the field casing having inwardly disposed surfaces arranged in a bore, exceeding the diameter of the core and conforming to its surface, said casing having a longitudinally extending channel portion and transverse bolts for contracting said channel portion and also contracting the casing to grip the core, said core having transverse surfaces to prevent longitudinal motion of said core, by engagement with said transverse bolts.

8. An electric tool having a field casing with a motor therein, the motor having a stator with a core, the field casing having an opening of a diameter slightly exceeding the diameter of the core, the casing being adapted to be circumferentially contracted and means for contracting the casing to cause the latter to grip the core, said contracting means comprising bolts arranged transversely to the axis, the core being apertured to admit and engage the bolts, thus positioning the core in the direction of its axis.

9. An electric tool having a field casing with a motor therein, the motor having a stator with a core, the field casing having an opening of a diameter slightly exceeding the diameter of the core, the casing being adapted to be circumferentially contracted and means for contracting the casing to cause the latter to grip the core, the core and contracting means having mutually contacting surfaces transverse to the motor axis to locate the core and to prevent longitudinal displacement of the core.

GLENN C. WILHIDE.